(12) United States Patent
Usami

(10) Patent No.: US 9,559,603 B2
(45) Date of Patent: Jan. 31, 2017

(54) POWER CONVERTER

(71) Applicant: TOYOTA JIDOSHA KABUSHIKI KAISHA, Toyota-shi, Aichi-ken (JP)

(72) Inventor: Tomohiro Usami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/944,827

(22) Filed: Nov. 18, 2015

(65) Prior Publication Data
US 2016/0149503 A1 May 26, 2016

(30) Foreign Application Priority Data

Nov. 26, 2014 (JP) .................. 2014-239036

(51) Int. Cl.
*H02M 3/335* (2006.01)
*H02M 7/5387* (2007.01)

(52) U.S. Cl.
CPC ..... *H02M 3/33584* (2013.01); *H02M 3/33561* (2013.01)

(58) Field of Classification Search
CPC .............. H02M 3/335; H02M 3/33507; H02M 3/33523; H02M 3/33569; H02M 3/33576; H02M 3/33584; H02M 3/33592
See application file for complete search history.

(56) References Cited

U.S. PATENT DOCUMENTS

| | | | |
|---|---|---|---|
| 2009/0196073 A1* | 8/2009 | Nakahori | H01F 38/00 363/17 |
| 2011/0198933 A1 | 8/2011 | Ishigaki et al. | |
| 2012/0155119 A1* | 6/2012 | Kim | H02M 3/33561 363/17 |
| 2014/0133187 A1* | 5/2014 | Hirano | H02M 3/33592 363/17 |

FOREIGN PATENT DOCUMENTS

JP 2011-193713 A 9/2011

* cited by examiner

*Primary Examiner* — Gary L Laxton
(74) *Attorney, Agent, or Firm* — Andrews Kurth Kenyon LLP

(57) ABSTRACT

A power converter including: a transformer; a primary-side full-bridge circuit including a primary-side coil of the transformer and a magnetically-coupled reactor, in which two reactors connected to both ends of the primary-side coil are magnetically coupled; a first port connected to a positive electrode bus bar of the primary-side full-bridge circuit; a second port connected to a tap of the primary-side coil; a secondary-side full-bridge circuit including a secondary-side coil of the transformer; a third port connected to a positive electrode bus bar of the secondary-side full-bridge circuit; a first search coil wound around a core of the magnetically-coupled reactor; a second search coil wound around a core of the transformer; and a detection circuit detecting voltages of the first port and the third port by measuring a variation in a sense voltage generated by combining voltages of the first search coil and the second search coil.

6 Claims, 5 Drawing Sheets

POWER CONVERTER

INCORPORATION BY REFERENCE

The disclosure of Japanese Patent Application No. 2014-239036 filed on Nov. 26, 2014 including the specification, drawings and abstract is incorporated herein by reference in its entirety.

BACKGROUND OF THE INVENTION

1. Field of the Invention

The invention relates to a technique of converting electric power among plural ports.

2. Description of Related Art

A power converter that includes: a transformer; a primary-side full-bridge circuit that is provided on a primary side of the transformer; a secondary-side full-bridge circuit that is provided on a secondary side of the transformer; a first port that is connected to a positive electrode bus bar of the primary-side full-bridge circuit; a second port that is connected to a tap of a primary-side coil of the transformer; and a third port that is connected to a positive electrode bus bar of the secondary-side full-bridge circuit has been known (for example, see Japanese Patent Application Publication No. 2011-193713 (JP 2011-193713 A)). The primary-side full-bridge circuit is a circuit including a bridge section that has: the primary-side coil of the transformer; and a magnetically-coupled reactor that is configured by magnetically coupling two reactors connected to both ends of the primary-side coil. Meanwhile, the secondary-side full-bridge circuit is a circuit including a bridge section that has a secondary-side coil of the transformer.

The power converter that is disclosed in JP 2011-193713 A detects a voltage of each port in order to convert electric power between two ports. However, when such a configuration in which separate detection circuits are used to detect the voltage of the first port and the voltage of the third port is adopted, cost tends to be increased. In addition, when the separate detection circuits are provided, fluctuation between detection accuracy of the voltage of the first port and detection accuracy of the voltage of the third port is generated.

SUMMARY OF THE INVENTION

In view of the above, a power converter that can suppress cost increase and fluctuation in detection accuracy is provided.

In one aspect, a power converter is provided that includes: a transformer having a primary-side coil and a secondary-side coil; a primary-side full-bridge circuit including a bridge section that has: the primary-side coil; and a magnetically-coupled reactor that is configured by magnetically coupling two reactors connected to both ends of the primary-side coil; a first port connected to a positive electrode bus bar of the primary-side full-bridge circuit; a second port connected to a tap of the primary-side coil; a secondary-side full-bridge circuit including a bridge section having the secondary-side coil; a third port connected to a positive electrode bus bar of the secondary-side full-bridge circuit; a first search coil wound around a core of the magnetically-coupled reactor; a second search coil wound around a core of the transformer; and a detection circuit detecting a voltage of the first port and a voltage of the third port by measuring a variation in a sense voltage that is generated by combining a voltage of the first search coil and a voltage of the second search coil among the voltage of the first search coil, the voltage of the second search coil, and the voltage of the first port.

According to the one aspect, since the voltage of the first port and the voltage of the third port are detected by the common detection circuit, cost can be reduced and the fluctuation in the detection accuracy can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a view that shows one example of the configuration of the power converter.

DETAILED DESCRIPTION OF EMBODIMENTS

Figure 1:
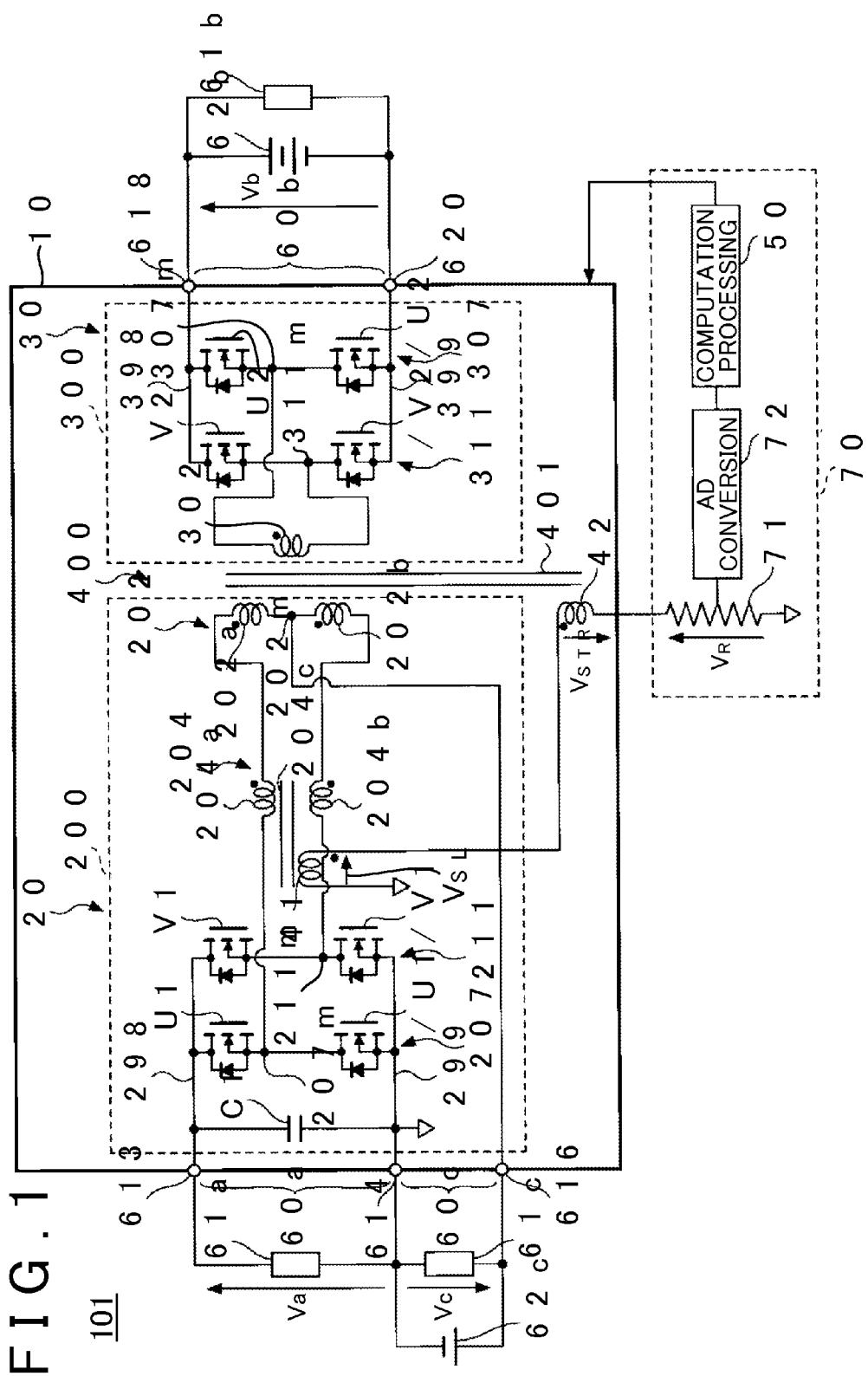
FIG. 1 is a view that shows one example of a configuration of a power converter.

<Configuration of Power Supply Device 101> FIG. 1 is a view that shows one example of a configuration of a power supply device 101 as one embodiment of the power converter. The power supply device 101 is a power supply system that includes, for example, a power supply circuit 10 and a detection circuit 70. The power supply device 101 is a system that is mounted in a vehicle, such as an automobile, and supplies electric power to each onboard load, for example.

The power supply device 101 has, as a primary-side port, a first port 60a, to which a primary-side high-voltage system load 61a is connected, and a second port 60c, to which a primary-side low-voltage system load 61c and an auxiliary battery 62c are connected, for example. The auxiliary battery 62c is one example of a primary-side low-voltage system power supply for supplying the electric power to the primary-side low-voltage system load 61c that is operated by the same voltage system (for example, a 12 V system) as the auxiliary battery 62c. In addition, the auxiliary battery 62c, for example, supplies the electric power that is stepped up by a primary-side conversion circuit 20 constituted in the power supply circuit 10 to the primary-side high-voltage system load 61a, and the primary-side high-voltage system load 61a is operated by a different voltage system (for example, a 48 V system that is higher than the 12 V system) from the auxiliary battery 62c. A specific example of the auxiliary battery 62c may be a secondary battery such as a lead battery.

The power supply device 101 has, as a secondary-side port, a third port 60b to which a secondary-side high-voltage system load 61b and a main battery (a propulsion battery/a traction battery) 62b are connected, for example. The main battery 62b is one example of a secondary-side high-voltage system power supply for supplying the electric power to the secondary-side high-voltage system load 61b that is operated by the same voltage system (for example, a 288 V system that is higher than the 12 V system and the 48 V system) as the main battery 62b. A specific example of the main battery 62b may be a secondary battery such as a lithium-ion battery.

The power supply circuit 10 has the above-described three ports, and is a power conversion circuit that has a function to select any two ports of those three ports and convert the electric power between said two ports. It should be noted that the power supply device 101 provided with the power supply circuit 10 may be a device that has at least three or more of plural ports and can convert the electric power between any two ports of the at least three or more of plural ports.

Port voltages Va, Vc, Vb are input/output voltages (input voltages or output voltages) at the first port 60a, the second port 60c, and the third port 60b, respectively.

The power supply circuit 10 may include a capacitor C1 that is provided to be connected to the first port 60a. Specific examples of the capacitor C1 may be a film capacitor, an aluminum electrolyte capacitor, a ceramic capacitor, a polymer solid electrolyte capacitor, and the like.

The capacitor C1 is, for example, inserted between a high-potential side terminal 613 of the first port 60a and a low-potential side terminal 614 of the first port 60a and the second port 60c. Since the capacitor C1 is connected to the first port 60a, for example, the port voltage Va can be smoothed.

The power supply circuit 10 is a power conversion circuit that is configured by including the primary-side conversion circuit 20 and a secondary-side conversion circuit 30. It should be noted that the primary-side conversion circuit 20 and the secondary-side conversion circuit 30 are magnetically coupled by a transformer 400. The primary-side port, which includes the first port 60a and the second port 60c, and the secondary-side port, which includes the third port 60b, are connected via the transformer 400.

The transformer 400 has a primary-side coil 202 and a secondary-side coil 302, and functions as a transformer having a turn ratio of the primary-side coil 202 to the secondary-side coil 302 being 1:N when the primary-side coil 202 and the secondary-side coil 302 are magnetically coupled by a coupling coefficient $k_T$. N is a positive number that is larger than 1. The transformer 400 is, for example, a center tap transformer that has a center tap 202m.

The primary-side coil 202 has a primary-side first winding 202a, a primary-side second winding 202b, and the center tap 202m that is drawn from an intermediate connecting point between the primary-side first winding 202a and the primary-side second winding 202b. The number of turns of the primary-side first winding 202a is equal to the number of turns of the primary-side second winding 202b. The center tap 202m is connected to a high-potential side terminal 616 of the second port 60c.

The primary-side conversion circuit 20 is a primary-side circuit that is configured by including a primary-side full-bridge circuit 200, the first port 60a, and the second port 60c. The primary-side full-bridge circuit 200 is provided on a primary side of the transformer 400. The primary-side full-bridge circuit 200 is a primary-side power converting section that is configured by including the primary-side coil 202 of the transformer 400, a primary-side magnetically-coupled reactor 204, a primary-side first upper arm U1, a primary-side first lower arm /U1, a primary-side second upper arm V1, and a primary-side second lower arm /V1.

Each of the primary-side first upper arm U1, the primary-side first lower arm /U1, the primary-side second upper arm V1, and the primary-side second lower arm /V1 is, for example, a switching element that is configured by including an N-channel MOSFET and a body diode (parasitic diode) as a parasitic element of said MOSFET. A diode may additionally be connected in parallel to each arm.

The primary-side full-bridge circuit 200 has: a primary-side positive electrode bus bar 298 that is connected to the high-potential side terminal 613 of the first port 60a; and a primary-side negative electrode bus bar 299 that is connected to the low-potential side terminal 614 of the first port 60a and the second port 60c.

A primary-side first arm circuit 207 that is configured by connecting the primary-side first upper arm U1 and the primary-side first lower arm /U1 in series is connected between the primary-side positive electrode bus bar 298 and the primary-side negative electrode bus bar 299. The primary-side first arm circuit 207 is a primary-side first power conversion circuit section (a primary-side U-phase power conversion circuit section) capable of a power converting operation by a switching operation between on/off of the primary-side first upper arm U1 and the primary-side first lower arm /U1.

A primary-side second arm circuit 211 that is configured by connecting the primary-side second upper arm V1 and the primary-side second lower arm /V1 in series is connected between the primary-side positive electrode bus bar 298 and the primary-side negative electrode bus bar 299. The primary-side second arm circuit 211 is connected in parallel with the primary-side first arm circuit 207. The primary-side second arm circuit 211 is a primary-side second power conversion circuit section (a primary-side V-phase power conversion circuit section) capable of the power converting operation by a switching operation between on/off of the primary-side second upper arm V1 and the primary-side second lower arm /V1.

The primary-side coil 202 and the primary-side magnetically-coupled reactor 204 are provided in a bridge portion that connects an intermediate point 207m of the primary-side first arm circuit 207 and an intermediate point 211m of the primary-side second arm circuit 211. A further detailed description will be made on connecting relationships in the bridge portion. One end of a primary-side first reactor 204a of the primary-side magnetically-coupled reactor 204 is connected to the intermediate point 207m of the primary-side first arm circuit 207. In addition, one end of the primary-side coil 202 is connected to the other end of the primary-side first reactor 204a. Furthermore, one end of a primary-side second reactor 204b of the primary-side magnetically-coupled reactor 204 is connected to the other end of the primary-side coil 202. Moreover, the other end of the primary-side second reactor 204b is connected to the intermediate point 211m of the primary-side second arm circuit 211.

The primary-side magnetically-coupled reactor 204 is configured by including the primary-side first reactor 204a and the primary-side second reactor 204b that is magnetically coupled to the primary-side first reactor 204a at a coupling coefficient $k_1$.

The intermediate point 207m is a primary-side first intermediate node between the primary-side first upper arm U1 and the primary-side first lower arm /U1, and the intermediate point 211m is a primary-side second intermediate node between the primary-side second upper arm V1 and the primary-side second lower arm /V1. The intermediate point 207m is connected to the intermediate point 211m through the primary-side first reactor 204a, the primary-side coil 202, and the primary-side second reactor 204b in this order.

The first port 60a is an input/output port that is connected to the primary-side full-bridge circuit 200 and provided between the primary-side positive electrode bus bar 298 and the primary-side negative electrode bus bar 299. The first port 60a is configured by including the terminal 613 and the terminal 614.

The second port 60c is an input/output port that is connected to the center tap 202m on the primary side of the transformer 400 and provided between the primary-side negative electrode bus bar 299 and the center tap 202m of the primary-side coil 202. The second port 60c is configured by including the terminal 614 and the terminal 616.

The secondary-side conversion circuit 30 is a secondary-side circuit that is configured by including a secondary-side full-bridge circuit 300 and the third port 60b. The secondary-side full-bridge circuit 300 is provided on a secondary side of the transformer 400. The secondary-side full-bridge circuit 300 is a secondary-side power converting section that is configured by including the secondary-side coil 302 of the transformer 400, a secondary-side first upper arm U2, a secondary-side first lower arm /U2, a secondary-side second upper arm V2, and a secondary-side second lower arm /V2.

Each of the secondary-side first upper arm U2, the secondary-side first lower arm /U2, the secondary-side second upper arm V2, and the secondary-side second lower arm /V2 is, for example, a switching element that is configured by including an N-channel MOSFET and a body diode (parasitic diode) as a parasitic element of said MOSFET. A diode may additionally be connected in parallel to each arm.

The secondary-side full-bridge circuit 300 has: a secondary-side positive electrode bus bar 398 that is connected to a high-potential side terminal 618 of the third port 60b; and a secondary-side negative electrode bus bar 399 that is connected to a low-potential side terminal 620 of the third port 60b.

A secondary-side first arm circuit 307 that is configured by connecting the secondary-side first upper arm U2 and the secondary-side first lower arm /U2 in series is connected between the secondary-side positive electrode bus bar 398 and the secondary-side negative electrode bus bar 399. The secondary-side first arm circuit 307 is a secondary-side first power conversion circuit section (a secondary-side U-phase power conversion circuit section) capable of the power converting operation by the switching operation between on/off of the secondary-side first upper arm U2 and the secondary-side first lower arm /U2.

A secondary-side second arm circuit 311 that is configured by connecting the secondary-side second upper arm V2 and the secondary-side second lower arm /V2 in series is connected between the secondary-side positive electrode bus bar 398 and the secondary-side negative electrode bus bar 399. The secondary-side second arm circuit 311 is connected in parallel with the secondary-side first arm circuit 307. The secondary-side second arm circuit 311 is a secondary-side second power conversion circuit section (a secondary-side V-phase power conversion circuit section) capable of the power converting operation by the switching operation between on/off of the secondary-side second upper arm V2 and the secondary-side second lower arm /V2.

The secondary-side coil 302 is provided in a bridge portion that connects an intermediate point 307m of the secondary-side first arm circuit 307 and an intermediate point 311m of the secondary-side second arm circuit 311. A further detailed description will be made on connecting relationships in the bridge portion. One end of the secondary-side coil 302 is connected to the intermediate point 307m of the secondary-side first arm circuit 307. In addition, the other end of the secondary-side coil 302 is connected to the intermediate point 311m of the secondary-side second arm circuit 311.

The intermediate point 307m is a secondary-side first intermediate node between the secondary-side first upper arm U2 and the secondary-side first lower arm /U2, and the intermediate point 311m is a secondary-side second intermediate node between the secondary-side second upper arm V2 and the secondary-side second lower arm /V2. The intermediate point 307m is connected to the intermediate point 311m through the secondary-side coil 302.

The third port 60b is an input/output port that is connected to the secondary-side full-bridge circuit 300 and provided between the secondary-side positive electrode bus bar 398 and the secondary-side negative electrode bus bar 399. The third port 60b is configured by including the terminal 618 and the terminal 620.

The detection circuit 70 is one example of a detection circuit that detects the port voltage Va of the first port 60a and the port voltage Vb of the third port 60b by measuring a variation in a sense voltage $V_R$ that is generated by combining a voltage $V_{SL}$ of a search coil 41 and a voltage $V_{STR}$ of a search coil 42. Since both of the port voltage Va and the port voltage Vb can be detected through the measurement of the common sense voltage $V_R$, a measurement circuit for measuring the variation in sense voltage $V_R$ can be used in common for the detection of the port voltage Va and the port voltage Vb. Thus, the port voltage Va and the port voltage Vb can be detected by the common detection circuit 70.

Since the detection circuit can be used in common, for example, a circuit scale of the detection circuit 70 can be reduced, and cost can also be reduced. In addition, fluctuation between detection accuracy of the port voltage Va and detection accuracy of the port voltage Vb can be suppressed from being generated.

For example, the detection circuit 70 has: the measurement circuit for measuring the variation in the sense voltage $V_R$ (sense resistance 71 and an analog to digital (AD) converter 72 are exemplified in FIG. 1); and a computation processing circuit 50 that computes the port voltage Va and the port voltage Vb on the basis of a measurement value obtained by said measurement circuit. Just as described, detection of the port voltage Va and the port voltage Vb can be handled by the common measurement circuit.

The search coil 41 is one example of a first search coil that is wound around a core 204c of the primary-side magnetically-coupled reactor 204. The search coil 42 is one example of a second search coil that is wound around a core 401 of the transformer 400. The search coil 41 is insulated from the primary-side full-bridge circuit 200 because it is wound around the core 204c, and the search coil 42 is insulated from the secondary-side full-bridge circuit 300 because it is wound around the core 401. Thus, even when the port voltage Va and the port voltage Vb are relatively high voltages, an insulation property between the detection circuit 70 and the primary-side full-bridge circuit 200 and an insulation property between the detection circuit 70 and the secondary-side full-bridge circuit 300 can be secured.

A closed circuit is configured by connecting the search coil 41, the search coil 42, and the sense resistance 71 in series. One end of the search coil 41 is connected to a ground reference of the primary-side full-bridge circuit 200, and, for example, is connected to the primary-side negative electrode bus bar 299. The other end of the search coil 41 is connected to one end of the search coil 42. The other end of the search coil 42 is connected to one end of the sense resistance 71.

The other end of the sense resistance 71 is connected to the ground reference of the primary-side full-bridge circuit 200, and is connected, for example, to the primary-side negative electrode bus bar 299.

Due to the connection just as described, the sense voltage $V_R$, which is generated by combining the voltage $V_{SL}$ induced at both of the ends of the search coil 41 and the voltage $V_{STR}$ induced at both of the ends of the search coil 42, can be generated at both of the ends of the sense resistance 71.

The AD converter 72 converts a measurement value of the analog sense voltage $V_R$ to digital data and outputs the data to the computation processing circuit 50.

It should be noted that the detection circuit 70 may have a function of detecting the port voltage Vc of the second port 60c. The detection circuit 70 may have at least one function of a function of detecting a port current Ia that flows into the terminal 613 of the first port 60a, a function of detecting a port current Ic that flows into the terminal 616 of the second port 60c, and a function of detecting a port current Ib that flows into a terminal 618 of the third port 60b.

The power supply device 101 includes the computation processing circuit 50. The computation processing circuit 50 is one example of a circuit that outputs a control signal for turning on/off each arm in the primary-side full-bridge circuit 200 and the secondary-side full-bridge circuit 300. The computation processing circuit 50 is, for example, a microcomputer that includes a CPU therein or an electronic circuit that includes a microcomputer.

Figure 2:
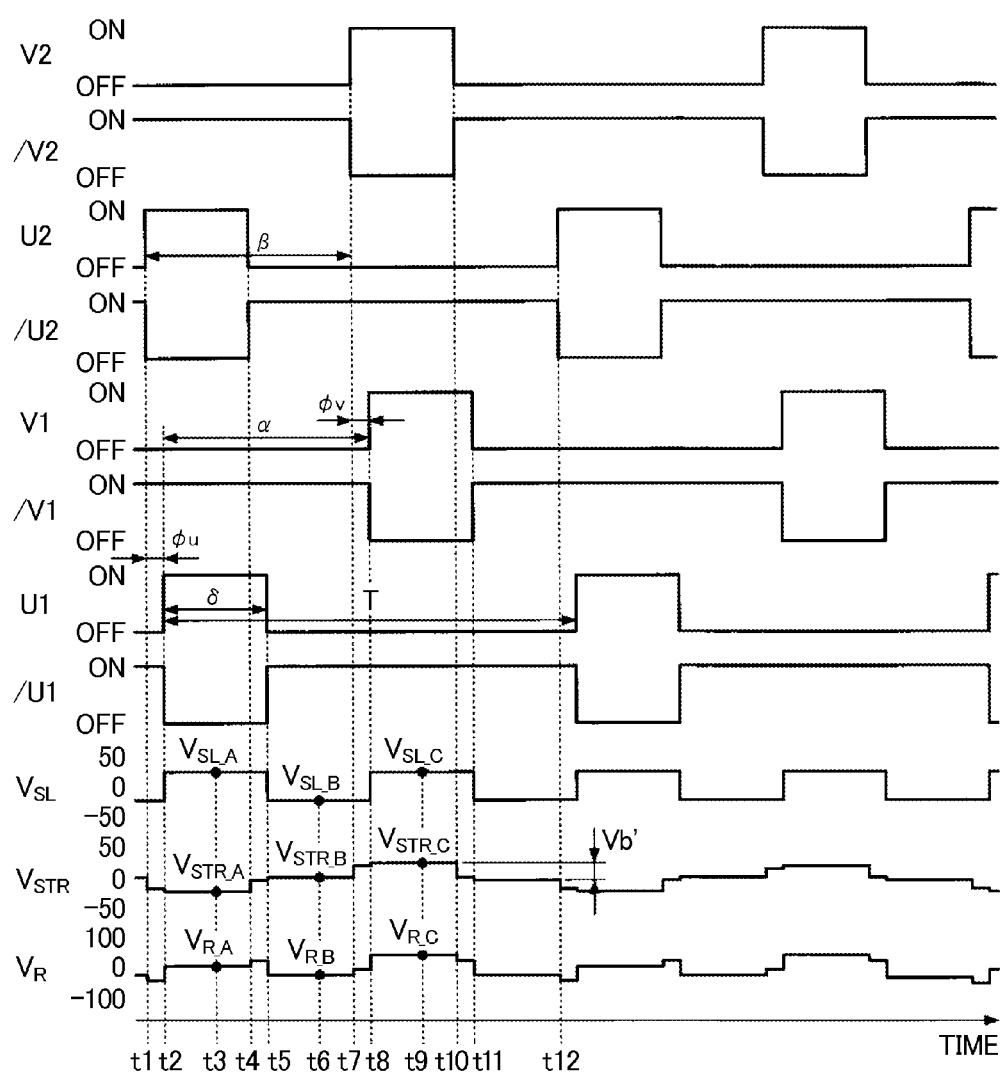
FIG. 2 is a timing chart that shows one example of an operation of the power converter.

FIG. 2 is a view that shows one example of a timing chart of on/off of each arm. In FIG. 2, U1 is an on/off waveform of the primary-side first upper arm U1, V1 is an on/off waveform of the primary-side second upper arm V1, U2 is an on/off waveform of the secondary-side first upper arm U2, and V2 is an on/off waveform of the secondary-side second upper arm V2. On/off waveforms of the primary-side first lower arm /U1, the primary-side second lower arm /V1, the secondary-side first lower arm /U2, and the secondary-side second lower arm /V2 are waveforms that are respectively formed by reversing the on/off waveforms of the primary-side first upper arm U1, the primary-side second upper arm V1, the secondary-side first upper arm U2, and the secondary-side second upper arm V2.

It should be noted that a dead time may be provided between both of the on/off waveforms of the upper and lower arms such that a through-current does not flow therethrough by turning on both of the upper and lower arms. In addition, in each of the eight on/off waveforms shown in FIG. 2, a high level thereof represents an on state, and a low level thereof represents an off state.

The computation processing circuit 50 turns on/off each arm by repeating a switching pattern that includes four periods. A first period from t2 to t4 is a period in which the first upper arms U1, U2 and the second lower arms /V1, /V2 are turned on while the second upper arms V1, V2 and the first lower arms /U1, /U2 are turned off. A second period from t5 to t7 is a period in which the first lower arms /U1, /U2 and the second lower arms /V1, /V2 are turned on while the first upper arms U1, U2 and the second upper arms V1, V2 are turned off. A third period from t8 to t10 is a period in which the first lower arms /U1, /U2 and the second upper arms V1, V2 are turned on while the first upper arms U1, U2 and the second lower arms /V1, /V2 are turned off. A fourth period from t11 to t12 is a period in which the first upper arms /U1, /U2 and the second lower arms /V1, /V2 are turned on while the first upper arms U1, U2 and the second upper arms V1, V2 are turned off.

The computation processing circuit 50 can change a voltage step-up/step-down ratio (a voltage step-up ratio or a voltage step-down ratio) of the primary-side full-bridge circuit 200 by controlling a duty ratio D(=δ/T), for example.

The duty ratio D corresponds to a ratio of an on period δ to a switching interval T of each of the primary-side first upper arm U1 and the primary-side second upper arm V1 in the primary-side full-bridge circuit 200. The duty ratio D of the primary-side first upper arm U1 and the duty ratio D of the primary-side second upper arm V1 are equal to each other. The voltage step-up/step-down ratio of the primary-side full-bridge circuit 200 is a transformation ratio between the first port 60a and the second port 60c.

Thus, for example, it is expressed such that the voltage step-up/step-down ratio of the primary-side full-bridge circuit 200=the voltage of the second port 60c/the voltage of the first port 60a=δ/T.

It should be noted that the on period δ represents an on period of each of the primary-side first upper arm U1 and the primary-side second upper arm V1, and also represents an on period of each of the secondary-side first upper arm U2 and the secondary-side second upper arm V2. In addition, the switching interval T of each arm that is constructed in the primary-side full-bridge circuit 200 and the switching interval T of each arm that is constructed in the secondary-side full-bridge circuit 300 are equal to each other.

Furthermore, the computation processing circuit 50, for example, operates the arms U1, V1 at 180 degrees (π) of a phase difference α between U1 and V1 and also operates the arms U2, V2 at 180 degrees (π) of a phase difference β between U2 and V2 during a normal time. The phase difference α between U1 and V1 is a time difference between timing t2 and timing t8, and the phase difference β between U2 and V2 is a time difference between timing t1 and timing t7.

Moreover, the computation processing circuit 50 can adjust transmission power P that is transmitted between the primary-side full-bridge circuit 200 and the secondary-side full-bridge circuit 300 via the transformer 400 by controlling a phase difference φ (a phase difference φu and a phase difference φv).

The phase difference φ is a deviation (a time lag) in switching timing between the power conversion circuit sections in the same phase in the primary-side full-bridge circuit 200 and the secondary-side full-bridge circuit 300.

The phase difference φu is the deviation in the switching timing between the corresponding phases in the primary-side first arm circuit 207 and the secondary-side first arm circuit 307, and is a time difference between switching of the primary-side first arm circuit 207 and switching of the secondary-side first arm circuit 307. For example, the phase difference φu is a difference between the timing t2 of turn-on of the primary-side first upper arm U1 and the timing t1 of turn-on of the secondary-side first upper arm U2. The switching of the primary-side first arm circuit 207 and the switching of the secondary-side first arm circuit 307 are controlled in mutually the same phase (that is, in the U phase) by the computation processing circuit 50.

The phase difference φv is the deviation in the switching timing between the corresponding phases in the primary-side second arm circuit 211 and the secondary-side second arm circuit 311, and is a time difference between switching of the primary-side second arm circuit 211 and switching of the secondary-side second arm circuit 311. For example, the phase difference φv is a difference between the timing t8 of turn-on of the primary-side second upper arm V1 and the timing t7 of turn-on of the secondary-side second upper arm V2. The switching of the primary-side second arm circuit 211 and the switching of the secondary-side second arm circuit 311 are controlled in mutually the same phase (that is, in the V phase) by the computation processing circuit 50.

The computation processing circuit 50 can transmit the transmission power P from the primary-side full-bridge circuit 200 to the secondary-side full-bridge circuit 300 by controlling the phase difference φu to be a positive value and the phase difference φv to be a positive value, and also can transmit the transmission power P from the secondary-side full-bridge circuit 300 to the primary-side full-bridge circuit 200 by controlling the phase difference φu to be a negative value and the phase difference φv to be a negative value. In other words, in the power conversion circuit sections in the same phase between the primary-side full-bridge circuit 200 and the secondary-side full-bridge circuit 300, the transmission power P is transmitted from the full-bridge circuit that includes the power conversion circuit section in which the upper arm is first turned on to the full-bridge circuit that includes the power conversion circuit section in which the upper arm is later turned on.

For example, in a case of FIG. 2, the timing t1 of the turn-on of the secondary-side first upper arm U2 is prior to the timing t2 of the turn-on of the primary-side first upper arm U1. Accordingly, the transmission power P is transmitted from the secondary-side full-bridge circuit 300 that includes the secondary-side first arm circuit 307 having the secondary-side first upper arm U2 to the primary-side full-bridge circuit 200 that includes the primary-side first arm circuit 207 having the primary-side first upper arm U1. Similarly, the timing t7 of the turn-on of the secondary-side second upper arm V2 is prior to the timing t8 of the turn-on of the primary-side second upper arm V1. Accordingly, the transmission power P is transmitted from the secondary-side full-bridge circuit 300 that includes the secondary-side second arm circuit 311 having the secondary-side second upper arm V2 to the primary-side full-bridge circuit 200 that includes the primary-side second arm circuit 211 having the primary-side second upper arm V1.

The computation processing circuit 50 usually controls the phase difference φu and the phase difference φv in a manner equal to each other. However, the computation processing circuit 50 may control the phase difference φu and the phase difference φv in a manner to deviate from each other within a range where accuracy requested to the transmission power P is satisfied. In other words, although the phase difference φu and the phase difference φv are usually controlled to have mutually the same value, they may be controlled to have different values as long as the accuracy requested to the transmission power P is satisfied.

The computation processing circuit 50 can control the duty ratio D by feeding back the port voltage Vc that is detected by the detection circuit 70 such that the port voltage Vc corresponds to a target voltage Vco set for the second port 60c, for example. Alternatively, at different timing, the computation processing circuit 50 can control the duty ratio D by feeding back the port voltage Va that is detected by the detection circuit 70 such that the port voltage Va corresponds to a target voltage Vao set for the first port 60a, for example.

Furthermore, the computation processing circuit 50 can control the phase difference φ by feeding back the transmission power P that is detected by the detection circuit 70 such that the transmission power P corresponds to target transmission power Po, for example. For example, the computation processing circuit 50 feeds back transmission power $P_{A+C}$ detected by the detection circuit 70 such that the transmission power $P_{A+C}$ transmitted from the third port 60b to the first port 60a and the second port 60c corresponds to target transmission power $P_{A+C}^*$, so as to execute power feedback control for controlling the phase difference φ. Alternatively, for example, at different timing, the computation processing circuit 50 feeds back transmission power $P_B$ detected by the detection circuit 70 such that the transmission power $P_B$ transmitted from the first port 60a to the third port 60b corresponds to target transmission power $P_B^*$, so as to execute the power feedback control for controlling the phase difference φ.

The transmission power $P_{A+C}$ is power that is transmitted from the secondary-side full-bridge circuit 300 to the primary-side full-bridge circuit 200 via the transformer 400, and is equal to a sum of transmission power $P_A$ that is transmitted to the first port 60a and transmission power $P_C$ that is transmitted to the second port 60c. The transmission power $P_A$ is equal to a product of the port voltage Va that is output from the first port 60a and the port current Ia that is output from the first port 60a. The transmission power $P_C$ is equal to a product of the port voltage Vc that is output from the second port 60c and the port current Ic that is output from the second port 60c. The transmission power $P_B$ is equal to a product of the port voltage Vb that is output from the third port 60b and the port current Ib that is output from the third port 60b.

Just as described, the power supply device 101 controls at least one of the duty ratio D and the phase difference φ by detecting the voltages Va, Vb, Vc of the ports by using the detection circuit 70, so as to convert the electric power between two ports. In particular, the detection circuit 70 detects the port voltage Va of the first port 60a and the port voltage Vb of the third port 60b by measuring the variation in the sense voltage $V_R$ that is generated by combining the voltage $V_{SL}$ of the search coil 41 and the voltage $V_{STR}$ of the search coil 42.

<Relationship Between Port Voltage Vb and Voltage $V_{STR}$> At timing t3 in the first period from t2 to t4, the port voltage Vb is applied to both of the ends of the secondary-side coil 302 of the transformer 400 since U2 and /V2 are on. The transformer 400 is energized by the port voltage Vb, and the voltage $V_{STR}$ of the search coil 42 becomes "$V_{STR}=-Vb/Ntr$" from principle of the transformer 400. Ntr represents the turn ratio (=Tb/Tsb) of the secondary-side coil 302 and the search coil 42. Tb represents the number of turns of the secondary-side coil 302, and Tsb represents the number of turns of the search coil 42. Tsb is smaller than Tb.

At timing t6 in the second period from t5 to t7, the voltage is not applied to both of the ends of the secondary-side coil 302 of the transformer 400 since /U2 and /V2 are on. Thus, "$V_{STR}=0$".

At timing t9 in the third period from t8 to t10, the port voltage Vb is applied in an opposite direction to both of the ends of the secondary-side coil 302 of the transformer 400 since V2 and /U2 are on. The transformer 400 is energized by the port voltage Vb, and the voltage $V_{STR}$ of the search coil 42 becomes "$V_{STR}=Vb/Ntr$" from the principle of the transformer 400.

<Relationship Between Port Voltage Va and Voltage $V_{SL}$> The primary-side magnetically-coupled reactor 204 is energized only by a current flowing therethrough in a same direction due to a polarity thereof. It is because a magnetic force of a current component that flows in a reverse direction is cancelled. Since the current that is transmitted between the first port 60a and the third port 60b flows in the reverse direction in the primary-side magnetically-coupled reactor 204, the primary-side magnetically-coupled reactor 204 is not energized. Since the current that is transmitted between the first port 60a and the second port 60c flows in the same direction in the primary-side magnetically-coupled reactor 204, the primary-side magnetically-coupled reactor 204 is energized.

Meanwhile, a case where the transformer 400 is energized is opposite of a case where the primary-side magnetically-coupled reactor 204 is energized. That is, the transformer 400 is energized by the current that is transmitted between the first port 60a and the third port 60b but is not energized by the current that is transmitted between the first port 60a and the second port 60c.

Figure 3:
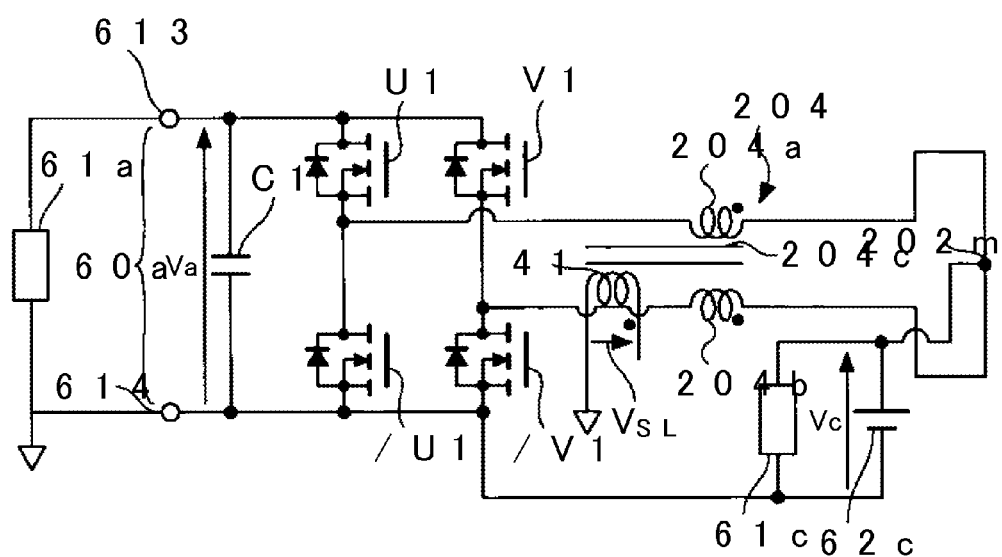
FIG. 3 is a view that shows one example of an equivalent circuit.

Thus, the energization of the primary-side magnetically-coupled reactor 204 can be evaluated by an equivalent circuit in FIG. 3.

When the primary-side magnetically-coupled reactor 204 is energized at the timing t3 in the first period from t2 to t4, U1 and /V1 are on. Accordingly, when a voltage applied to both of the ends of the primary-side first reactor 204a at the timing t3 is set as $V_{L1\_A}$ and a voltage applied to both of the ends of the primary-side second reactor 204b at the timing t3 is set as $V_{L2\_A}$, $V_{L1\_A}$=0−Vc$V_{L2\_A}$=Va−Vc. Thus, the primary-side magnetically-coupled reactor 204 is energized by a voltage $V_{L\_TOTAL\_A}$ in which $V_{L1\_A}$ and $V_{L2\_A}$ are combined (=Va−2×Vc) at the timing t3.

When the primary-side magnetically-coupled reactor 204 is energized at the timing t6 in the second period from t5 to t7, /U1 and /V1 are on. Accordingly, when a voltage applied to both of the ends of the primary-side first reactor 204a at the timing t6 is set as $V_{L1\_B}$ and a voltage applied to both of the ends of the primary-side second reactor 204b at the timing t6 is set as $V_{L2\_B}$, $V_{L1\_B}$=0−Vc$V_{L2\_B}$=0−Vc. Thus, the primary-side magnetically-coupled reactor 204 is energized by a voltage $V_{L\_TOTAL\_B}$ in which $V_{L1\_B}$ and $V_{L2\_B}$ are combined (=−2×Vc) at the timing t6.

Thus, a difference between the voltage $V_{L\_TOTAL\_A}$ and the voltage $V_{L\_TOTAL\_B}$ is Va. In other words, since the voltage $V_{L\_TOTAL\_A}$ and the voltage $V_{L\_TOTAL\_B}$ can be monitored by the search coil 41, a relationship of "Va=$V_{SL\_A}$−$V_{SL\_B}$" is established. $V_{SL\_A}$ is the voltage $V_{SL}$ at the timing t3, and $V_{SL\_B}$ is the voltage $V_{SL}$ of the timing t6.

<Derivation of Computation Formula of Port Voltage Vb>
From FIG. 1, for the voltage that is generated in each of the search coils 41, 42 and the sense resistance 71, a formula (1) is established. $V_R$=$V_{SL}$+$V_{STR}$ ... (1) In addition, similarly, the voltages that are measured at the timing t3, t6, t9 are expressed by formulae (2), (3), and (4). $V_{R\_A}$=$V_{SL\_A}$+$V_{STR\_A}$ ... (2) $V_{R\_B}$=$V_{SL\_B}$+$V_{STR\_B}$ ... (3) $V_{R\_C}$=$V_{SL\_C}$+$V_{STR\_C}$ ... (4) A formula (5) is obtained by subtracting the formula (2) from the formula (4). $V_{R\_C}$−$V_{R\_A}$=$V_{SL\_C}$+$V_{STR\_C}$−$V_{SL\_A}$−$V_{STR\_A}$ ... (5) $V_{SL\_A}$ and $V_{SL\_C}$ are equal to each other. It is because, in the principle, the primary-side magnetically-coupled reactor 204 is energized only by the current flowing between the first port 60a and the second port 60c. $V_{SL\_A}$=$V_{SL\_C}$ ... (6) A formula (7) is obtained by plugging the formula (6) in the formula (5). $V_{R\_C}$−$V_{R\_A}$=$V_{SL\_C}$+$V_{STR\_C}$−$V_{SL\_C}$−$V_{STR\_A}$=$V_{STR\_C}$−$V_{STR\_A}$ ... (7) Meanwhile, a voltage Vb' is expressed by a formula (8). It is because, while the voltage, a positive or negative value of which is reversed in the secondary-side full-bridge circuit 300, is applied to a high-voltage side of the transformer 400, a voltage in a similar form is also applied to a low-voltage side of the transformer 400 in the principle. Vb'=($V_{STR\_C}$−$V_{STR\_A}$)/2 ... (8) A formula (9) is obtained by plugging the formula (7) in the formula (8). Vb'=($V_{R\_C}$−$V_{R\_A}$)/2 ... (9) The port voltage Vb is determined by Vb' and the turn ratio Ntr due to the principle of the transformer 400. Ntr represents the turn ratio (=Tb/Tsb) of the secondary-side coil 302 and the search coil 42. Vb=Vb'×Ntr ... (10) A formula (11) can be derived by plugging the formula (9) in the formula (10). Vb=($V_{R\_C}$−$V_{R\_A}$)/2×Ntr ... (11) That is, according to the formula (11), the detection circuit 70 can detect the port voltage Vb on the basis of a measurement value $V_{R\_A}$ that is obtained by measuring the sense voltage $V_R$ in the first period from t2 to t4 and a measurement value $V_{R\_C}$ that is obtained by measuring the sense voltage $V_R$ in the third period from t8 to t10. For example, the computation processing circuit 50 can compute the port voltage Vb on the basis of the formula (11).

<Derivation of Computation Formula of Port Voltage Va>
A formula (12) is obtained by subtracting the formula (3) from the formula (4). $V_{R\_C}$−$V_{R\_B}$=$V_{SL\_C}$+$V_{STR\_C}$−$V_{SL\_B}$−$V_{STR\_B}$ ... (12) Meanwhile, a formula (13) is established from the principle of the transformer 400. Vb'=($V_{STR\_C}$−$V_{STR\_B}$) ... (13) In addition, a formula (14) is established as described above. Va=$V_{SL\_A}$−$V_{SL\_B}$=$V_{SL\_C}$−$V_{SL\_B}$ ... (14) A formula (15) is obtained by switching an alignment order on a right side of the formula (12) and plugging the formula (13) and the formula (14). $V_{R\_C}$−$V_{R\_B}$=$V_{SL\_C}$−$V_{SL\_B}$+$V_{STR\_C}$−$V_{STR\_B}$=Va+Vb' ... (15) A formula (16) is obtained by modifying the formula (15). Va=$V_{R\_C}$−$V_{R\_B}$−Vb' ... (16) A formula (17) can be derived by plugging the formula (9) in the formula (16). Va=$V_{R\_C}$−$V_{R\_B}$−($V_{R\_C}$−$V_{R\_A}$)/2 ... (17) That is, according to the formula (17), the detection circuit 70 can detect the port voltage Va on the basis of the measurement value $V_{R\_A}$ that is obtained by measuring the sense voltage $V_R$ in the first period from t2 to t4, a measurement value $V_{R\_B}$ that is obtained by measuring the sense voltage $V_R$ in the second period from t5 to t7, and the measurement value $V_{R\_C}$ that is obtained by measuring the sense voltage $V_R$ in the third period from t8 to t10. For example, the computation processing circuit 50 can compute the port voltage Va on the basis of the formula (17).

<Derivation of Computation Formula of Port Voltage Vc>
The port voltage Vc is determined by the port voltage Va and the duty ratio D, and can be expressed by a formula (18) (a basic principle formula of a step-down converter). Vc=Va×D ... (18) For example, the computation processing circuit 50 can compute the port voltage Vc on the basis of the formula (18) by using the port voltage Va that is computed from the formula (17).

Figure 4:
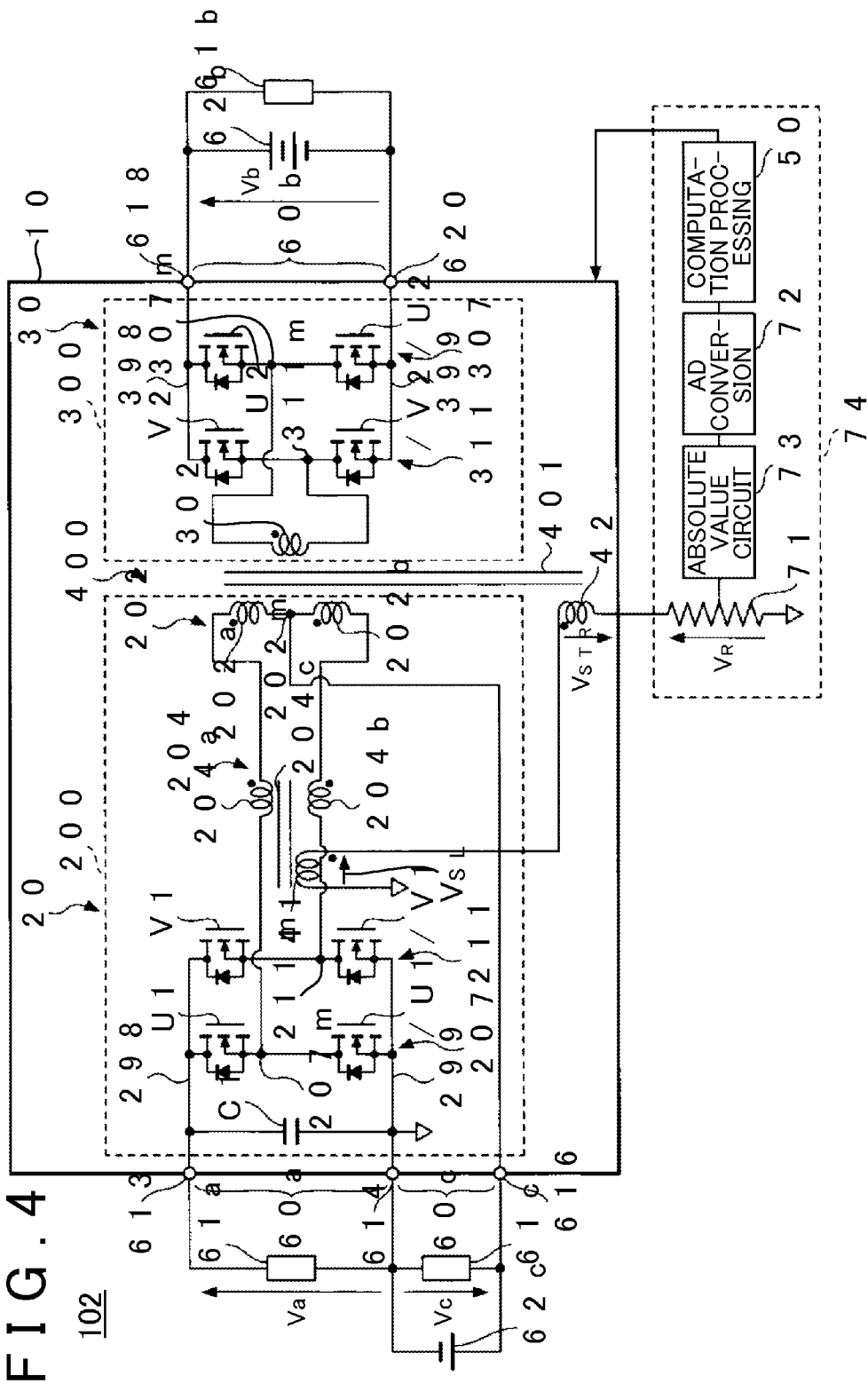
FIG. 4 is a view that shows one example of the configuration of the power converter.

<Configuration of Power Supply Device 102> FIG. 4 is a view that shows one example of a configuration of a power supply device 102 as one embodiment of the power converter. A description on the similar configuration and effect to those of the power supply device 101 will not be made. A detection circuit 74 differs from the detection circuit 70 in FIG. 1 in a point of having an absolute value circuit 73.

The sense voltage $V_R$ has the positive or negative value. The absolute value circuit 73 is a circuit that outputs an absolute value of the sense voltage $V_R$ to the AD converter 72. Since the absolute value circuit 73 is provided, the AD converter 72 that can measure the positive and negative values does not have to be adopted. Thus, cost reduction and downsizing of the AD converter 72 can be realized.

It should be noted that, in a case of FIG. 4, the negative voltage values in the waveform of the voltage $V_R$ in FIG. 2 are replaced with the positive voltage values. Accordingly, the port voltage Va can be expressed by a formula (19) by replacing "$V_{R\_B}$" in the formula (17) with "−$V_{R\_B}$". Va=$V_{R\_C}$+$V_{R\_B}$−($V_{R\_C}$−$V_{R\_A}$)/2 ... (19) That is, in the case of FIG. 4, the computation processing circuit 50 can compute the port voltage Va on the basis of the formula (19). It should be noted that, in the case of FIG. 4, the computation processing circuit 50 can compute the port voltage Vb on the basis of the formula (11) and can compute the port voltage Vc on the basis of the formula (18).

Figure 5:
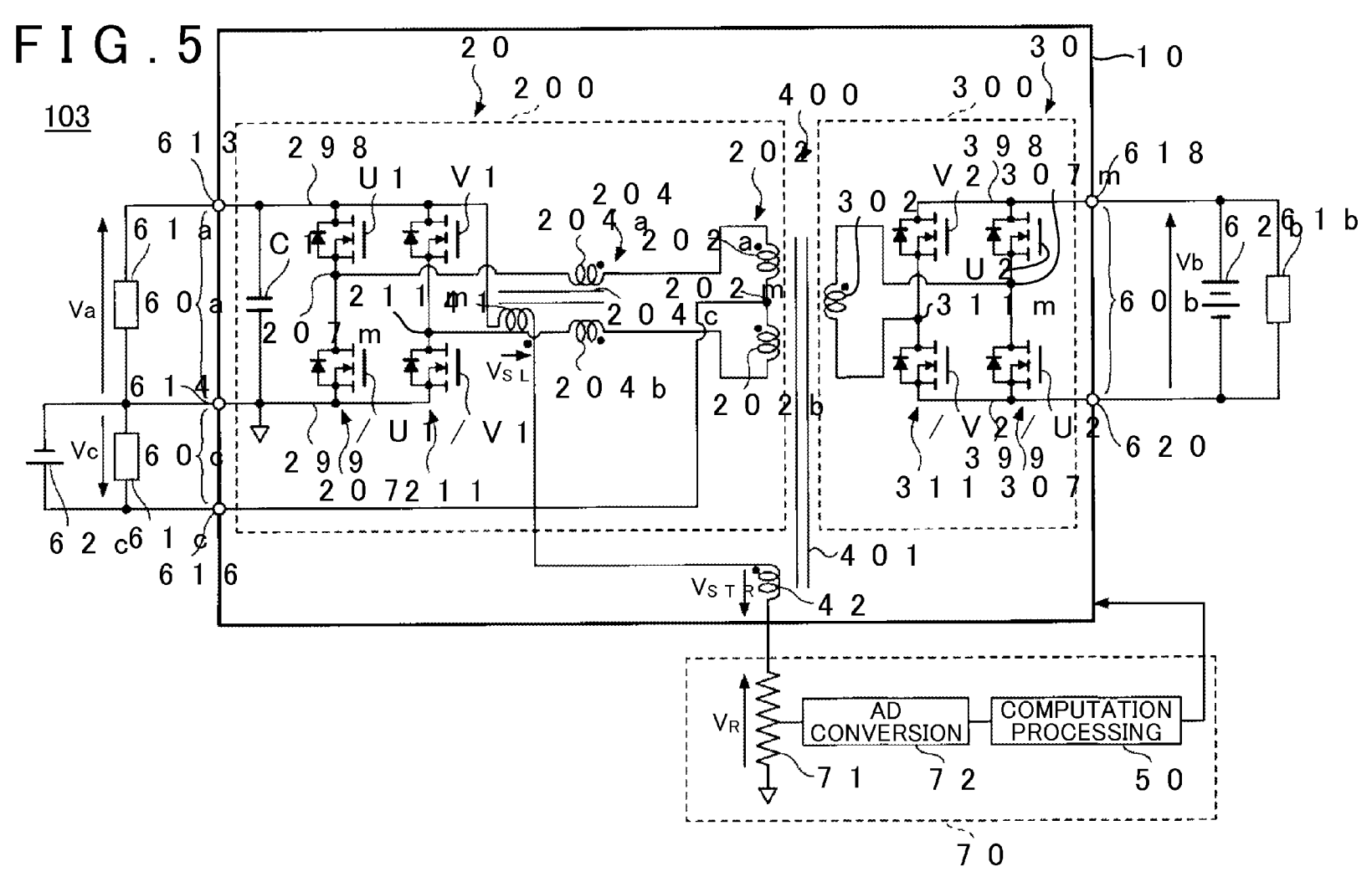

<Configuration of Power supply Device 103> FIG. 5 is a view that shows one example of a configuration of a power supply device 103 as one embodiment of the power converter. The description on the similar configuration and effect to those of the power supply device 101 will not be made. A case of FIG. 5 differs from that of FIG. 1 in a point that the one end of the search coil 41 in FIG. 5 is connected to the primary-side positive electrode bus bar 298 of the primary-side full-bridge circuit 200.

Since the one end of the search coil 41 is connected to the primary-side positive electrode bus bar 298 of the primary-side full-bridge circuit 200, the sense voltage $V_R$ can have a non-negative value. In this way, the AD converter 72 that can measure the positive and negative values does not have to be adopted. Thus, the cost reduction and downsizing of the AD converter 72 can be realized.

The one end of the search coil 41 is connected to the primary-side positive electrode bus bar 298 of the primary-side full-bridge circuit 200. Accordingly, the detection circuit 70 in FIG. 5 detects the port voltage Va and the port voltage Vb by measuring the variation in the sense voltage $V_R$ that is generated by combining the voltage $V_{SL}$ of the search coil 41, the voltage $V_{STR}$ of the search coil 42, and the port voltage Va.

<Derivation of Computation Formula of Port Voltage Vb in Case of FIG. 5> From FIG. 5, for the voltage that is generated in each of the search coils 41, 42 and the sense resistance 71, a formula (21) is established. $V_R = V_{SL} + V_{STR} + Va$ . . . (21) In addition, similarly, the voltages that are measured at the timing t3, t6, t9 are expressed by formulae (22), (23), and (24). $V_{R\_A} = V_{SL\_A} + V_{STR\_A} + Va$ . . . (22) $V_{R\_B} = V_{SL\_B} + V_{STR\_B} + Va$ . . . (23) $V_{R\_C} = V_{SL\_C} + V_{STR\_C} + Va$ . . . (24) The formula (5) is obtained by subtracting the formula (22) from the formula (24), and the formula (12) is obtained by subtracting the formula (23) from the formula (24). That is, Va is cancelled. Accordingly, similar to what has been described above, the port voltages Va, Vb, Vc can respectively be expressed by the formula (17), the formula (11), and the formula (18).

The power converter has been described so far in the embodiments. However, the invention is not limited to the above embodiments. Various modifications and improvements, such as combination or replacement with a portion or a whole of other embodiment, can be possible within a scope of the invention.

For example, each arm is not limited to the MOSFET but may be another semiconductor switching element that is operated to be on/off. For example, each arm may be a power element of a voltage control type by an insulation gate, such as an IGBT or the MOSFET, or may be a bipolar transistor.

In addition, a power supply connected to the first port 60a may be present, or a power supply connected to the second port 60c may not be present.

Furthermore, in the above description, the primary side may be defined as the secondary side, and the secondary side may be defined as the primary side.

What is claimed is:

1. A power converter comprising:
   a transformer having a primary-side coil and a secondary-side coil;
   a primary-side full-bridge circuit including a bridge section that has: the primary-side coil; and a magnetically-coupled reactor that is configured by magnetically coupling two reactors connected to both ends of the primary-side coil;
   a first port connected to a positive electrode bus bar of the primary-side full-bridge circuit;
   a second port connected to a tap of the primary-side coil;
   a secondary-side full-bridge circuit including a bridge section having the secondary-side coil;
   a third port connected to a positive electrode bus bar of the secondary-side full-bridge circuit;
   a first search coil wound around a core of the magnetically-coupled reactor;
   a second search coil wound around a core of the transformer; and
   a detection circuit detecting a voltage of the first port and a voltage of the third port by measuring a variation in a sense voltage that is generated by combining a voltage of the first search coil and a voltage of the second search coil among the voltage of the first search coil, the voltage of the second search coil, and the voltage of the first port.

2. The power converter according to claim 1, wherein
   the primary-side full-bridge circuit has a first upper arm, a first lower arm connected in series to the first upper arm, a second upper arm, and a second lower arm connected in series to the second upper arm,
   the secondary-side full-bridge circuit has a first upper arm, a first lower arm connected in series to the first upper arm, a second upper arm, and a second lower arm connected in series to the second upper arm,
   a period in which the first upper arm and the second lower arm are turned on and the second upper arm and the first lower arm are turned off in regard to both of the primary-side full-bridge circuit and the secondary-side full-bridge circuit is set as a first period,
   a period in which the first lower arm and the second lower arm are turned on and the first upper arm and the second upper arm are turned off in regard to both of the primary-side full-bridge circuit and the secondary-side full-bridge circuit is set as a second period,
   a period in which the first lower arm and the second upper arm are turned on and the first upper arm and the second lower arm are turned off in regard to both of the primary-side full-bridge circuit and the secondary-side full-bridge circuit is set as a third period,
   the detection circuit detects the voltage of the first port on the basis of a first measurement value that is obtained by measuring the sense voltage in the first period, a second measurement value that is obtained by measuring the sense voltage in the second period, and a third measurement value that is obtained by measuring the sense voltage in the third period, and
   the detection circuit detects the voltage of the third port on the basis of the first measurement value and the third measurement value.

3. The power converter according to claim 2, wherein
   the first measurement value, the second measurement value, the third measurement value, the number of turns of the secondary-side coil, and the number of turns of the second search coil are respectively set as $V_{R\_A}$, $V_{R\_B}$, $V_{R\_C}$, Tb, and Tsb, and the detection circuit computes the voltage of the first port on the basis of $(V_{R\_C} - V_{R\_B}) - (V_{R\_C} - V_{R\_A})/2$ and computes the voltage of the third port on the basis of $(V_{R\_C} - V_{R\_A})/2 \times$ (Tb/Tsb).

4. The power converter according to claim 1, wherein one end of the first search coil is connected to the positive electrode bus bar of the primary-side full-bridge circuit.

5. The power converter according to claim 1, wherein one end of the first search coil is connected to a ground reference of the primary-side full-bridge circuit.

6. The power converter according to claim 1, wherein the detection circuit has an absolute value circuit.

* * * * *